Oct. 11, 1955  J. R. ERWIN  2,720,356
CONTINUOUS BOUNDARY LAYER CONTROL IN COMPRESSORS
Filed June 12, 1952

Inventor
JOHN R. ERWIN
By
Attorneys

United States Patent Office 2,720,356
Patented Oct. 11, 1955

2,720,356

CONTINUOUS BOUNDARY LAYER CONTROL IN COMPRESSORS

John R. Erwin, Elizabeth City County, Va.

Application June 12, 1952, Serial No. 293,231

1 Claim. (Cl. 230—122)

(Granted under Title 35, U. S. Code (1952), sec. 266)

This invention relates to improvements in compressors of the type primarily useful as a component of an aircraft engine assembly.

The purpose of this invention is to improve the performance of gas compressors, particularly the multistaged axial flow type of compressor. As is well known to those versed in the art, the low energy gas near the aerodynamic surfaces of gas compressors detracts from the optimum operation of the compressor. The thickness of the low energy region increases with the pressure rise and length of travel along a surface and has a cumulative effect. Thus, in a conventional multistaged axial flow compressor, the flow in the exit stages exhibits very thick, wasteful boundary layers. The invention provides means for continuously removing this low energy boundary layer from the compressor.

Previous attempts to improve compressor performance through the application of boundary layer control have relied on a single circumferential slot in the compressor casing or single slots located on the blade surfaces through which air is blown (see Patent No. Re. 23,108). These previous methods fail to prevent the cumulative action responsible for the rapid increase in boundary layer thickness and associated ill effects. Accordingly, it is a further object of the invention to provide porous means in the compressor as a working component or as a supplementary element, for withdrawing relatively low energy boundary layer air in such a manner as to prevent the previously mentioned cumulative effect by relying on the pressure drop existing between the internal blower passages and the surrounding atmosphere for bleeding off said boundary layer air. The air which is bled off in this way may be exhausted to the atmosphere or used for miscellaneous purposes such as bearing cooling, cabin heating, supercharging, ice removal, and exterior surface boundary layer control.

Other objects and features of importance will become apparent in following the description of the illustrated forms of the invention.

Figure 1:
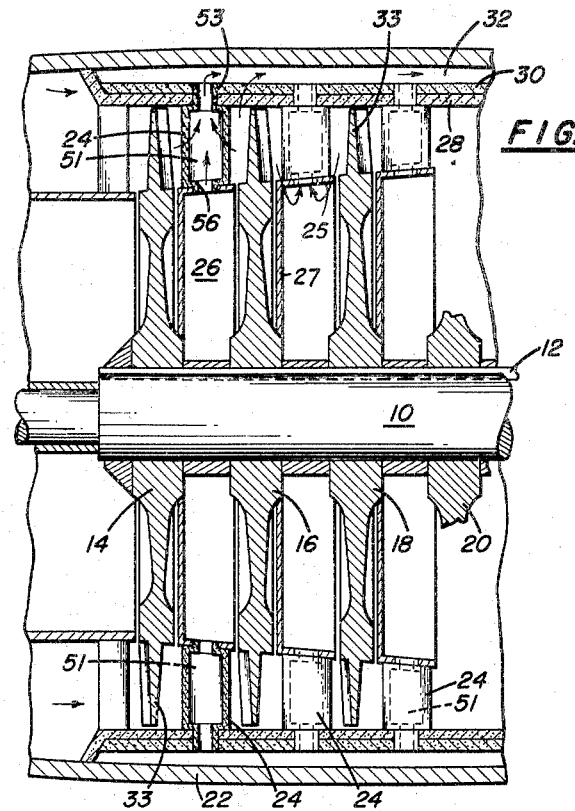
Fig. 1 is a fragmentary longitudinal sectional view of one form of the invention.

In order to obtain continuous or essentially continuous boundary layer control in axial flow compressor, several variations of the rather broad principle are disclosed, however, they fall into two main classes, that is, casing or shell control and blade or vane control. The former is seen best in Figs. 1-3 where, as common structure, there is a shaft 10 to which impellers are fixed, as by the use of a key 12. In Fig. 1 the shaft with its impellers 14, 16, 18 and 20 are enclosed in a conventional casing 22, and the arrangement is indicative of a multistaged, axial flow compressor. The fixed guide vanes 24 which are disposed between stages of the compressor, differ from the conventional in that they are made of a porous material, such as sintered, perforated or woven metal.

The vanes 24 are supported at their inner ends by means of the webs 26, and their outer ends are carried by the porous liners 28 and 30 which form a part of the casing structure. The supporting structure for the inner side of the guide vanes has a peripheral mounting flange 25 and an upstream side wall 27 spaced slightly from its adjacent impeller, the downstream side of the support being open as shown. Liners 28 and 30 are spaced from the inner surface of the casing outer wall thereby leaving an air passageway 32 in which air from the aerodynamic surfaces of the compressor is collected and directed for auxiliary uses. Although it is easier from a mechanical standpoint to make only the guide vanes 24 of a porous material it is possible to construct the impeller blades or vanes 33 of a permeable or porous substance, and there are distinct advantages in this expedient, as will be pointed out hereinafter. The airflow, as shown, is through the porous flange 25, the passage 51 in guide vane 24 and out through passage 32 through the walls of porous guide vanes 24, into the interior thereof and thence out through passage 32; and through the porous liners 28 and 30 into the passage 32.

Figure 2:
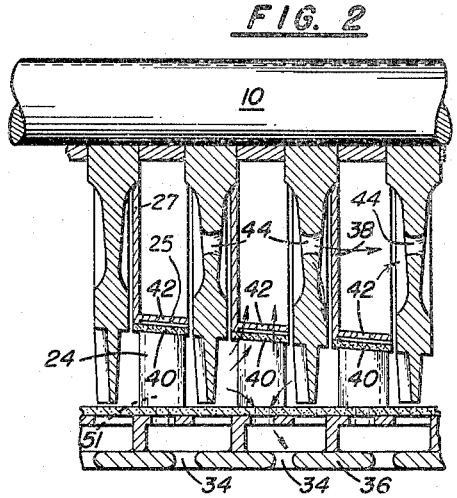
Fig. 2 is a fragmentary longitudinal sectional view of another form of the invention.

Fig. 2 differs from Fig. 1 by having exit slots 34 in the casing 36 to allow the boundary layer air to waste to the atmosphere. Also, the guide vane supports 38 are provided with annular porous liners 40 through which air may circulate; appropriate apertures 42 and 44 being provided in the supports and impeller webs to allow circulation. Airflow in this embodiment is different from that in Fig. 1 in that an additional flow is obtained toward the shaft 10. This flow passes through aperture 44 and at least partially exits into the compressor section between the impeller and the upstream side 27 of web 26. Airflow is also obtained through the porous liner 40, adjacent blades 24.

Figure 3:
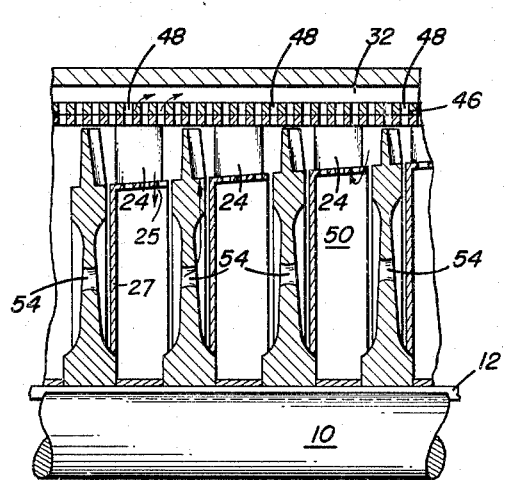
Fig. 3 is a fragmentary longitudinal sectional view of another embodiment.

In Fig. 3 the liner 46 is made of a material different from the previously described porous elements. It is composed of a large number of layers of material, as metal, with very small passages 48 therein. The liner 46 is laminated with the passages between the layers only a few thousandths of an inch wide, the size of these passages being greatly exaggerated in Fig. 3. The vane supports 50 have a similarly laminated portion on which the vanes 24 seat. In this way with apertures 54 provided in the impeller webs circulation is obtained to aid in bleeding off boundary layer air from the compressor elements. Airflow is as shown by the arrows, only certain flows being shown for purposes of clarity.

Figure 4:
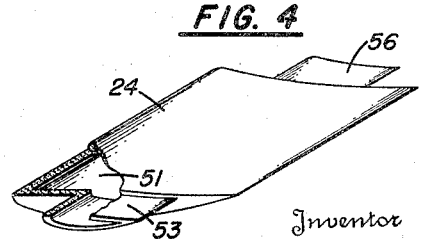
Fig. 4 is a perspective view of a blade which constitutes a part of the invention.

The typical vane 24 of Fig. 4 includes a longitudinally extending passageway 51 extending through the vane including reduced ends 53 and 56, the passageway constituting an air duct through which low energy, boundary layer air passes for ultimate further use after passing through the air collecting and directing passageway 32. Alternatively, the air may be wasted by use of an arrangement of discharge slots as shown in Fig. 2.

In use, the vanes 24 may be used alone, or any of the various liners may be present alone in a compressor. Various combinations of liners and vanes may be used together, some of the possible variations being shown in the drawing. In any event, the general operation is similar. In most axial flow compressors, subsonic and supersonic, the static pressure of the gas flow is raised above the inlet static pressure before the exit of the first rotor or impeller. In aircraft having inlet pressures increased by the ram effect of the forward speed, the flow static pressure will be considerably above local atmospheric pressure. The fact of having higher internal than external pressures makes possible the bleeding of some of the internal air flow either directly into the atmosphere without additional pumps or to some other part of the engine for cooling, thrust balancing, cabin heating, ice formation control, or control of boundary layer on wings or other external aircraft surfaces. Removing some of the internal flow and particularly the low energy boundary gas through the porous compressor casing elements or blades in this way has several advantages.

The customary high local losses associated with the juncture between a compressor blade and the compressor casing can be greatly reduced, and increased efficiency can be obtained. An effect separate from the reduction of losses is the measurable increase in blade lift obtained when the casing boundary layer is continuously removed. Higher blade lift coefficients result in higher compressor pressure ratios and either lighter engines or more efficient thermal propulsion for a fixed engine weight.

An important effect is concerned with the inherent difficulty of estimating the boundary layer thickness which will exist in the later stages of a multi-stage compressor. As the boundary layer acts as a constriction in the flow passage, the main flow velocity is dependent upon the boundary layer thickness. The angular setting of the compressor rotor and stator blades depends on the main flow velocity as one parameter. As the blade operation and efficiency decrease at off-optimum setting, the compressor performance is greatly influenced by boundary layer conditions. This is particularly true in production compressors in which manufacturing accuracy limits require appreciable blade tip clearances, promoting rapid boundary layer growth. By continuously removing the low energy gas, the uncertainty concerning this important factor can be largely eliminated.

In addition, increased operating range may be obtained through the removal of a significant amount of the internal flow through the porous members described previously. The removal of a quantity of the internal flow from a middle compressor stage will increase the too low angle of attack of the compressor blades at high quantity flow through the compressor. This effect is cumulative, also, because increasing the density change across that stage, decreasing the flow velocity and increasing the angle of attack into the following element, etc. The operating range of axial flow compressors can be increased by proper control of the blow-off gas.

Figure 5:
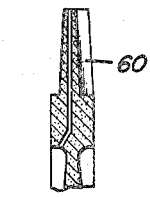
Fig. 5 is a fragmentary perspective view of a modified impeller blade.

The advantages of the permeable or porous compressor blades 60 are numerous. The blades or vanes 60 of Fig. 5 are made of porous material, this fragmentary view showing that such blades may be used in any or all of the illustrated embodiments, or may be used in an otherwise conventional axial flow compressor. Usual compressor blades, even when operated between walls with continuous boundary layer removal, fail to obtain the lift calculated by exact theoretical methods. This failure is due in a large part to the boundary layers which accumulate on the blade surfaces as a result of the rapid rise in pressure experienced by the gas flow in passing around the blades. Blades or vanes constructed of porous material having a hollow central portion vented to the atmosphere or to another part of the aircraft would permit removal of this low energy gas through the blade surfaces. Such blades would approach the theoretical lift, and would result in higher pressure rise per stage.

In conventional compressors, the flow losses, other than those associated with the blade profile, are so much larger than the profile drag loss that little is to be gained through a reduction in this ordinarily minor factor. However, with the boundary layer removal, the profile drag loss is significant, and tests show that profile drag can be greatly reduced by continuous boundary layer control.

Various changes and modifications as fall within the scope of the following claim, may be made without departing from the protection afforded herein.

The invention described herein may be manufactured and used by or for the Government of the United States of America for governmental purposes without the payment of any royalties thereon or therefor.

What is claimed is:

In an axial flow compressor, a casing, first and second impellers mounted in spaced apart relation on a shaft in said casing, said impellers having apertures therethrough, rotor blades carried by each of said impellers, porous, hollow stator blades positioned between the rotor blades of the first impeller and the rotor blades of the second impeller, a porous web between said first and second impellers, said web comprising a downstream wall extending adjacent to but spaced from said first impeller and a flange at the outer periphery of said wall extending towards but spaced from said second impeller, said flange supporting the inner ends of said stator blades, a porous liner adjacent to but spaced from said casing, said liner supporting the outer ends of said stator blades, and an outlet passage communicating with the space between said liner and said casing, whereby boundary layer air may be removed through said stator blades and liner by means of said outlet passage and also through said stator blade and flange into the space within said flange, and thence may be reintroduced into the compressor air stream at the next stage thereof after passage through the apertures in said impellers.

References Cited in the file of this patent

UNITED STATES PATENTS

| | | |
|---|---|---|
| 2,344,835 | Stalker | Mar. 21, 1944 |
| 2,618,433 | Loos et al. | Nov. 18, 1952 |
| 2,658,719 | Johanson | Nov. 11, 1953 |
| 2,675,174 | McDowall et al. | Apr. 13, 1954 |

FOREIGN PATENTS

| | | |
|---|---|---|
| 619,722 | Great Britain | Mar. 14, 1949 |
| 722,424 | Germany | July 9, 1942 |
| 963,540 | France | Jan. 4, 1950 |